United States Patent
Hase

(10) Patent No.: US 9,630,854 B2
(45) Date of Patent: Apr. 25, 2017

(54) SILICON CARBIDE POWDER

(71) Applicant: BRIDGESTONE CORPORATION, Tokyo (JP)

(72) Inventor: Kazuhito Hase, Kunitachi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/900,800

(22) PCT Filed: Jun. 20, 2014

(86) PCT No.: PCT/JP2014/066404
§ 371 (c)(1),
(2) Date: Dec. 22, 2015

(87) PCT Pub. No.: WO2014/208460
PCT Pub. Date: Dec. 31, 2014

(65) Prior Publication Data
US 2016/0137513 A1    May 19, 2016

(30) Foreign Application Priority Data
Jun. 26, 2013  (JP) .................................. 2013-133921

(51) Int. Cl.
*C01B 31/36* (2006.01)
*C04B 35/575* (2006.01)

(52) U.S. Cl.
CPC ............ *C01B 31/36* (2013.01); *C04B 35/575* (2013.01); *C01P 2004/61* (2013.01); *C04B 2235/5436* (2013.01); *C04B 2235/5463* (2013.01); *C04B 2235/77* (2013.01)

(58) Field of Classification Search
CPC .................. C01B 31/36; C04B 35/575; C04B 2235/5463; C04B 2235/5436; C04B 2235/77; Y10T 428/2892

USPC ........................................................ 428/402
See application file for complete search history.

(56) References Cited

U.S. PATENT DOCUMENTS

| | | | | |
|---|---|---|---|---|
| 6,251,353 B1 * | 6/2001 | Kajiwara | ............... | B82Y 30/00 423/345 |
| 6,627,169 B1 * | 9/2003 | Itoh | .......... | C01B 31/36 423/345 |
| 6,632,761 B1 * | 10/2003 | Ushita | .................... | C01B 31/36 252/516 |
| 2012/0295112 A1 | 11/2012 | Sasaki et al. | | |
| 2013/0323152 A1 | 12/2013 | Aoki et al. | | |

FOREIGN PATENT DOCUMENTS

| | | | |
|---|---|---|---|
| CN | 102958834 A | | 3/2013 |
| JP | 10-120411 A | | 5/1998 |
| JP | 2001-130972 | * | 5/2001 |
| JP | 2001-130972 A | | 5/2001 |
| JP | 2009-173501 A | | 8/2009 |
| WO | 2012121060 A1 | | 9/2012 |

OTHER PUBLICATIONS

Communication dated Feb. 16, 2016 issued by the European Patent Office in corresponding European Application No. 14816624.2.
Taiwan Office Action for Application No. 103121647 dated Apr. 17, 2015.
International Search Report for PCT/JP2014/066404 dated Aug. 5, 2014 [PCT/ISA/210].
Written Opinion for PCT/JP2014/066404 dated Aug. 5, 2014 [PCT/ISA/237].

* cited by examiner

*Primary Examiner* — Leszek Kiliman
(74) *Attorney, Agent, or Firm* — Sughrue Mion, PLLC

(57) ABSTRACT

The present invention is a silicon carbide powder which is suitable for producing a high-strength silicon carbide sintered body, wherein: the molar ratio between carbon and silicon in a mixture containing a silicon source, a carbon source, and a catalyst is 2.5 or more; and the average particle diameter is 10 μm or more and 25 μm or less.

3 Claims, 2 Drawing Sheets

FIG. 3

| | | | Comparative Example 1 | Comparative Example 2 | Example 1 | Example 2 | Comparative Example 3 | Example 3 | Comparative Example 4 |
|---|---|---|---|---|---|---|---|---|---|
| Composition of Powder | Silicon Source | | Ethyl Silicate | Methyl Silicate | Methyl Silicate | Methyl Silicate | Methyl Silicate | Methyl Silicate | Methyl Silicate |
| | Carbon Source | | Phenolic Resin | Phenolic Resin | Phenolic Resin | Phenolic Resin | Phenolic Resin | Phenolic Resin | Phenolic Resin |
| | Catalyst | | Aqueous Solution of Maleic Acid | Aqueous Solution of Maleic Acid | Aqueous Solution of Maleic Acid | Aqueous Solution of Maleic Acid | Aqueous Solution of Maleic Acid | Aqueous Solution of Maleic Acid | Aqueous Solution of Maleic Acid |
| | Compounding Ratio | Silicon Source | 62.3% | 60.5% | 59.6% | 60.0% | 58.8% | 57.9% | 57.1% |
| | | Carbon Source | 28.4% | 34.5% | 35.4% | 37.0% | 36.2% | 37.1% | 37.9% |
| | | Catalyst | 9.3% | 5.0% | 5.0% | 3.0% | 5.0% | 5.0% | 5.0% |
| | C/Si | | 2.4 | 2.4 | 2.5 | 2.6 | 2.6 | 2.7 | 2.8 |
| Particle Diameter of Powder | Average Particle Diameter (D50) | | 35 | 35 | 25 | 20 | 34 | 15 | 1 |
| | D10 | | 15 | 11 | 10 | 8 | 13 | 4 | 0 |
| | D90 | | 380 | 86 | 50 | 39 | 92 | 33 | 2 |
| | D90/D10 | | 24.6 | 7.6 | 4.9 | 4.7 | 7.0 | 7.8 | 12.7 |
| | Amount of FC (Amount of Particles) | | 0.032 | 0.005 | 0.007 | 0.224 | 0.006 | 0.777 | 2.594 |
| Evaluation Result | Sintering Property | | △ | ○ | ○ | ○ | ○ | ○ | × |
| | Density | | 3.14 | 3.14 | 3.15 | 3.15 | 3.15 | 3.14 | 3.08 |
| | Visual Observation Result of Chipping Occurrence | | × | × | ○ | ◎ | × | ◎ | — |

SILICON CARBIDE POWDER

CROSS REFERENCE TO RELATED APPLICATIONS

This application is a National Stage of International Application No. PCT/JP2014/066404, filed on Jun. 20, 2014, which claims priority from Japanese Patent Application No. 2013-133921, filed on Jun. 26, 2013, the contents of all of which are incorporated herein by reference in their entirety.

TECHNICAL FIELD

The present invention relates to a silicon carbide powder.

BACKGROUND ART

Heretofore, there has been propose a method for producing a high purity silicon carbide powder by mixing a silicon source (specifically, ethyl silicate), which is liquid at ordinary temperature, a carbon source (specifically, a phenolic resin), which is liquid at ordinary temperature, and a catalyst (specifically, maleic acid) capable of dissolving the carbon source. Specifically, a silicon carbide powder is produced by heating a mixture containing the silicon source, the carbon source, and the catalyst (for example, Patent Literature 1).

In the case of using maleic acid as the catalyst, the content of sulfur contained in the silicon carbide powder is low in comparison with a case of using toluenesulfonic acid as the catalyst. Thus, the use of maleic acid as the catalyst enables the production of a silicon carbide powder suitable in the field of semiconductor where sulfur serves as an impurity.

Additionally, there has also been proposed a technique of heating a mixture containing a silicon source, a carbon source, and a catalyst in two stages in order to produce a silicon carbide powder having an average particle diameter of 100 to 200 μm. Moreover, it is also known that when a ratio between carbon contained in the carbon source and silicon contained in the silicon source (hereinafter, C/Si) is more than 2.0 but less than 2.5, the amount of free carbon can be reduced (for example, Patent Literature 2).

CITATION LIST

Patent Literatures

Patent Literature 1: Japanese Patent Application Publication No. Hei 10-120411
Patent Literature 2: Japanese Patent Application Publication No. 2009-173501

SUMMARY OF INVENTION

Technical Problem

Meanwhile, a sintered silicon carbide is produced by grinding a silicon carbide powder, placing the ground silicon carbide powder (hereinafter, ground powder) in a mold for sintered body, and sintering the ground powder placed in the mold for sintered body. Such a sintered silicon carbide is demanded to be a high-strength sintered silicon carbide.

As a result of intensive studies, the present inventors have found out appropriate C/Si and appropriate average particle diameter of a silicon carbide powder for producing a high-strength sintered silicon carbide.

Accordingly, the present invention has been made to meet the above-described demand. An object of the present invention is to provide a silicon carbide powder suitable for the production of a high-strength sintered silicon carbide.

Solution to Problem

A silicon carbide powder according to a first feature is characterized in that a ratio between carbon contained in a mixture containing a silicon source, a carbon source, and a catalyst and silicon contained in the mixture is 2.5 or more in terms of molar ratio. The silicon carbide powder has an average particle diameter of 10 μm or more but 25 μm or less.

In the first feature, a particle diameter, at which cumulated particles having smaller particle diameters account for 90% in a particle size distribution of the silicon carbide powder, is more than 25 μm but not more than 50 μm.

In the first feature, the silicon source is methyl silicate.

Advantageous Effects of Invention

The present invention makes it possible to provide a silicon carbide powder suitable for the production of a high-strength sintered silicon carbide.

BRIEF DESCRIPTION OF DRAWINGS

FIG. 3 is a table showing the experimental result.

DESCRIPTION OF EMBODIMENTS

Hereinafter, a silicon carbide powder according to an embodiment of the present invention will be described with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other in some cases.

Summary of Embodiment

In the silicon carbide powder according to the embodiment, a ratio between carbon contained in a mixture composed of a silicon source, a carbon source, and a catalyst and silicon contained in the mixture is 2.5 or more in terms of molar ratio. The silicon carbide powder has an average particle diameter of 10 μm or more but 25 μm or less.

In the embodiment, since the ratio (C/Si) between carbon and silicon of the mixture is 2.5 or more in terms of molar ratio and the average particle diameter of the silicon carbide powder is 10 μm or more but 25 μm or less, a silicon carbide powder is obtained for producing a high-strength sintered silicon carbide.

First Embodiment

Method for Producing Silicon Carbide Powder

Figure 1:
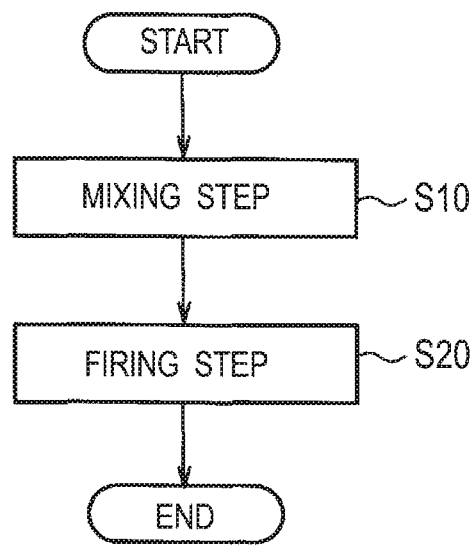
FIG. 1 is a flowchart for illustrating a method for producing a silicon carbide powder according to a first embodiment.

A method for producing a silicon carbide powder according to a first embodiment will be described. FIG. 1 is a flowchart for illustrating the method for producing the silicon carbide powder according to the first embodiment. As shown in FIG. 1, the method for producing the silicon carbide powder according to the first embodiment has a mixing step S10 and a firing step S20.

(Mixing Step S10)

The mixing step S10 is a step of mixing a silicon source, which is liquid at ordinary temperature, a carbon source, which is liquid at ordinary temperature, and a catalyst (polymerization catalyst or crosslinking catalyst) capable of dissolving the carbon source to thereby form a mixture containing the silicon source, the carbon source, and the catalyst.

An example of the silicon source includes methyl silicate (i.e., tetramethoxysilane). As the silicon source, a monomer of methyl silicate may be used, or a polymer of methyl silicate (for example, a low-molecular-weight polymer (oligomer) of methyl silicate) may be used. Here, the term oligomer means a polymer having a polymerization degree of approximately 2 to 15.

As the methyl silicate, it is preferable to use methyl silicate which has a purity determined according to the application of the silicon carbide powder. In a case where high purity methyl silicate is used, the initial impurity content of the methyl silicate is preferably 20 ppm or less, further preferably 5 ppm or less.

The carbon source is preferably selected from coal tar pitch having a high residual carbon ratio; phenolic resins, furan resins, epoxy resins, and phenoxy resins; monosaccharides such as glucose; oligosaccharides such as sucrose; and polysaccharides such as cellulose and starch.

In order to homogeneously mix the carbon source with the methyl silicate, the carbon source is liquid at ordinary temperature. Specifically, the carbon source may be a substance dissolved in a solvent, or may be a thermoplastic or heat-soluble substance which softens or liquefies by heating. As the carbon source, it is preferable to use a compound composed only of hydrogen atoms and carbon atoms, from the viewpoint of residual carbon ratio, thermal polymerization, or thermal crosslinking. Specifically, the carbon source is preferably selected from phenolic resins, polyvinyl alcohols, and polyvinyl acetates.

The catalyst (polymerization catalyst or crosslinking catalyst) is preferably selected from, for example, saturated carboxylic acids, unsaturated carboxylic acids, dicarboxylic acids, and aromatic carboxylic acids. The catalyst is particularly preferably selected from saturated aliphatic dicarboxylic acids, unsaturated aliphatic carboxylic acids, and derivatives thereof. Specifically, the catalyst is preferably selected from maleic acid (pKa=1.75), acrylic acid (pKa=4.26), oxalic acid (pKa1=1.04, pKa2=3.82), itaconic acid (pKa1=3.85, pKa2=5.45), malonic acid (pKa1=2.62, pKa2=5.28), and succinic acid (pKa1=4.00, pKa2=5.24). From the viewpoint of solubility in water, the catalyst is preferably selected from maleic acid and derivatives thereof.

Examples of the maleic acid derivatives include maleic anhydride, and the like. Note that examples of the aromatic carboxylic acids include salicylic acid (pKa=2.81), phenoxyacetic acid (pKa=2.99), and phthalic acid (pKa=2.75).

The catalyst is preferably a compound composed only of carbon atoms, hydrogen atoms, and oxygen atoms. Since the catalyst is composed only of carbon atoms, hydrogen atoms, and oxygen atoms, such a catalyst does not contain sulfur, unlike toluenesulfonic acid ($C_7H_8O_3S$), which is a commonly-used catalyst in conventional techniques. Thus, no hazardous sulfur compound is generated in the firing step.

The catalyst preferably has a favorable homogeneity so that the catalyst can react and homogenously dissolve with at least the carbon source. From the viewpoint of reactivity improvement, the catalyst is preferably a compound containing a carboxyl group. Herein, the term "favorable homogeneity" means that the catalyst homogenously diffuses into the carbon source at a molecular level by mixing the carbon source with the catalyst.

(1) The pKa value of maleic acid (1.75) is almost comparable to the pKa value of toluenesulfonic acid (1.4), and maleic acid has enough acidity. (2) Since maleic acid contains both unsaturated bonds and carboxyl groups in the molecule, maleic acid has an affinity with a hydrophobic portion and a hydrophilic portion and is likely to be homogenously mixed with the methyl silicate and the carbon source. (3) Since a strong exothermic reaction is not induced, the hardening reaction moderately takes place, and it is easy to control the reaction rate by the amount of the catalyst added. From these viewpoints, maleic acid is preferably used as the catalyst.

In the first embodiment, the ratio between carbon contained in the mixture of the carbon source, the methyl silicate, and the catalyst and silicon contained in the mixture (hereinafter, C/Si) is preferably 2.5 or more in terms of molar ratio. The C/Si of the mixture is adjusted by the amounts of the methyl silicate, the carbon source, and the catalyst. The C/Si of the mixture can be defined by elemental analysis of a carbide intermediate obtained by carbonizing the mixture.

As preferable blending ratios of the methyl silicate, the carbon source, and the catalyst, for example, the carbon source is 40 to 60 weight %, and the catalyst is 5 to 10 weight %, when the methyl silicate is represented by 100 weight %. The catalyst may be mixed with the methyl silicate and the carbon source, while being dissolved in a solvent containing no impurity. The catalyst may be used in a saturated state in a solvent such as water or acetone (i.e., as a saturated solution).

Herein, since the methyl silicate, the carbon source, and the catalyst are allowed to react homogenously with each other in the firing step, it is important to homogeneously mix the methyl silicate, the carbon source, and the catalyst. A surfactant may be added as appropriate to the mixture according to the degree of homogeneity of the mixture. As the surfactant, it is possible to use SPAN 20, TWEEN 20 (product name, manufactured by Kanto Chemical Co., Inc.), or the like. The amount of the surfactant added is preferably 5 to 10 weight %, when the mixture is represented by 100 weight %.

In the first embodiment, the methyl silicate, the carbon source, and the catalyst are mixed together in the mixing step S10. Specifically, it is preferable that the methyl silicate and the carbon source be mixed by thoroughly stirring the two and then the catalyst be added thereto. The mixture of the methyl silicate, the carbon source, and the catalyst is solidified. The mixture is preferably solidified into a gel form.

Moreover, after the catalyst is added to the methyl silicate and the carbon source, the mixture may be heated. Further, the mixture may be carbonized by heating the solid mixture at a temperature of 800° C. to 1000° C. for 30 to 120 minutes in a non-oxidizing atmosphere such as nitrogen or argon.

Note that such heating is performed in a temperature range lower than that in the firing step S20, and should be considered as a pretreatment.

(Firing Step S20)

The firing step S20 is a step of heating the mixture of the methyl silicate, the carbon source, and the catalyst in a non-oxidizing atmosphere to thereby form a silicon carbide powder. The mixture formed in the mixing step S10 is heated, for example, in an argon atmosphere at 1350° C. to 2000° C. for approximately 30 minutes to 3 hours, and thereby a silicon carbide powder is obtained.

The term non-oxidizing atmosphere means an atmosphere with no oxidizing gas present. For example, the non-oxidizing atmosphere may be an inert atmosphere (nitrogen, a noble gas such as helium or argon, or the like), or may be a vacuum atmosphere.

Note that, in the firing step S20, carbon contained in the mixture serves as a reducing agent, and a reaction of "$SiO_2+C \rightarrow SiC$" takes place.

In a case where the silicon carbide powder obtained in the firing step S20 contains carbon, the silicon carbide powder may be decarbonized by heating in an air atmosphere furnace. The heating temperature for the silicon carbide powder in the decarbonization treatment is for example 700° C.

In the first embodiment, the silicon carbide powder has an average particle diameter of 10 μm or more but 25 μm or less. The heating temperature and the heating period are determined so that the silicon carbide powder can have an average particle diameter of 10 μm or more but 2.5 μm or less.

Figure 2:
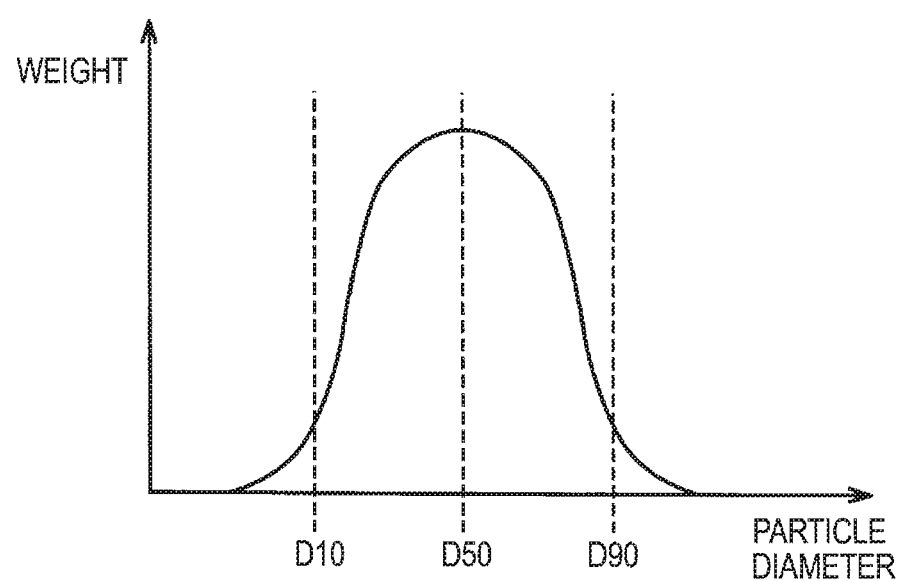
FIG. 2 is a graph showing a particle diameter distribution of the silicon carbide powder according to the first embodiment.

Now, the "average particle diameter" will be described with reference to FIG. 2. FIG. 2 is a graph showing a particle size distribution of the silicon carbide powder. In FIG. 2, the vertical axis represents the weight, and the horizontal axis represents the particle diameter.

As shown in FIG. 2, the "average particle diameter" refers to a particle diameter (D50) at which cumulated particles having smaller particle diameters account for 50% of the weight of all the particles in the particle size distribution of the silicon carbide powder.

Now, consider a case where a particle diameter (D10) at which cumulated particles having smaller particle diameters account for 10% of the weight of all the particles is a first particle diameter and a particle diameter (D90) at which cumulated particles having smaller particle diameters account for 90% of the weight of all the particles is a second particle diameter, in the particle size distribution of the silicon carbide powder. In such a case, the second particle diameter, at which the cumulated particles having smaller particle diameters account for 90%, is more than 25 μm but not more than 50 μm. Further, from the viewpoint of suppressing chipping which occurs in a product polishing step, the upper limit of the second particle diameter is preferably less than 40 μm.

Additionally, it should be noted that the particle size distribution of the silicon carbide powder is obtained by sieving the silicon carbide powder using several types of sieves.

(Functions and Effects)

In the first embodiment, the C/Si of the mixture is 2.5 or more in terms of molar ratio, and the silicon carbide powder has an average particle diameter of 10 μm or more but 25 μm or less. Thus, a silicon carbide powder is obtained for producing a high-strength sintered silicon carbide.

Evaluation Result

Hereinafter, the evaluation result will be described. Samples (silicon carbide powders) according to Comparative Examples 1 to 4 and Examples 1 to 3 were prepared for the evaluation. The compositions and the particle diameters of these samples are as shown in FIG. 3. Moreover, for the evaluation, these samples were sintered under a temperature condition of 2280° C., a pressure condition of 500 kgf/cm$^2$, and a time condition of 9 hours to thereby produce ingots, and then the ingots were polished. The ingots produced in this manner were evaluated for "sintering property," "density (g/cm$^3$)," and "visual observation result."

The "sintering property" is an evaluation item regarding the sintering of the sample. "◯" indicates that the entire sample was favorably sintered, "Δ" indicates that only a portion of the sample was sintered, and "x" indicates that the sample was hardly sintered. The "density" is an evaluation item regarding the density of the sample after the sintering. The "visual observation result" is an evaluation item regarding chipping which occurs in the polishing step. "◎" indicates that no chipping was observed, "◯" indicates that chipping was hardly observed, and "x" indicates that chipping was observed. Note that "-" indicates that the evaluation was not performed because the sample was not sintered.

As shown in FIG. 3, in Examples 1 to 3 where the C/Si of the mixtures was 2.5 or more in terms of molar ratio and the particle diameter (D50), that is, average particle diameter, was 10 μm or more but 25 μm or less, chipping was reduced in the polishing step. It was verified that the use of the silicon carbide powders according to Examples 1 to 3 enables the production of high-strength sintered silicon carbides.

Moreover, in Examples 1 to 3 where the C/Si of the mixtures was 2.5 or more in terms of molar ratio and the particle diameter (D90) was more than 25 μm but not more than 50 μm, chipping was hardly observed in the polishing step. It was verified that the use of the silicon carbide powders according to Examples 1 to 3 enables the production of high-strength sintered silicon carbides. Further, in Examples 2 and 3 where the particle diameter (D90) was more than 25 μm but less than 40 μm, it was observed that chipping was further reduced in comparison with in Example 1.

Note that, in Comparative Example 3 where the C/Si of the mixture was 2.5 or more in terms of molar ratio but the particle diameter (D50), that is, average particle diameter, was more than 25 μm, chipping occurred more than in Examples 1 to 3. Moreover, in Comparative Example 4 where the C/Si of the mixture was 2.5 or more in terms of molar ratio but the particle diameter (D50), that is, average particle diameter, was less than 10 μm, the sample was not sintered at all.

Other Embodiments

The present invention has been described by use of the above-described embodiment. However, it should not be understood that the description and drawings which constitute part of this disclosure limit the present invention. From this disclosure, various alternative embodiments, examples, and operation techniques will be easily found by those skilled in the art.

INDUSTRIAL APPLICABILITY

The present invention makes it possible to provide a silicon carbide powder suitable for the production of a high-strength sintered silicon carbide.

The invention claimed is:

1. A silicon carbide powder obtained by heating in a non-oxidizing atmosphere a mixture containing a silicon source, a carbon source, and a catalyst, wherein
   a ratio between carbon contained in the mixture and silicon contained in the mixture is 2.5 or more in terms of molar ratio,
   the silicon carbide powder has an average particle diameter of 10 μm or more but 25 μm or less,
   a particle diameter, at which cumulated particles having smaller particle diameters account for 90% in a particle size distribution of the silicon carbide powder, is more than 25 μm but not more than 50 μm,
   the silicon source is methyl silicate, and
   the catalyst is maleic acid or a derivative thereof.

2. A process for obtaining a silicon carbide powder by heating in a non-oxidizing atmosphere a mixture containing a silicon source, a carbon source, and a catalyst, wherein
   a ratio between carbon contained in the mixture and silicon contained in the mixture is 2.5 or more in terms of molar ratio,
   the silicon carbide powder has an average particle diameter of 10 μm or more but 25 μm or less,
   a particle diameter, at which cumulated particles having smaller particle diameter account for 90% in a particle size distribution of the silicon carbide powder, is more than 25 μm but not more than 50 μm,
   the silicon source is methyl silicate, and
   the catalyst is maleic acid or a derivative thereof.

3. The process of claim 2, wherein the heating step is in an argon atmosphere at 1350° C. to 2000° C. for 30 minutes to 3 hours.

\* \* \* \* \*